United States Patent
Rinaldi et al.

(10) Patent No.: US 7,487,277 B2
(45) Date of Patent: Feb. 3, 2009

(54) APPARATUS, SYSTEM, AND METHOD FOR OVERRIDING RESOURCE CONTROLLER LOCK OWNERSHIP

(75) Inventors: Brian Anthony Rinaldi, Tucson, AZ (US); Micah Robison, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 148 days.

(21) Appl. No.: 11/247,465

(22) Filed: Oct. 11, 2005

(65) Prior Publication Data

US 2007/0083687 A1 Apr. 12, 2007

(51) Int. Cl.
*G06F 12/14* (2006.01)
*G06F 12/00* (2006.01)
*G06F 11/00* (2006.01)

(52) U.S. Cl. .................. 710/200; 711/152; 714/43; 714/56

(58) Field of Classification Search ................. 710/200; 711/152; 714/56, 43
See application file for complete search history.

(56) References Cited

U.S. PATENT DOCUMENTS

| | | | |
|---|---|---|---|
| 5,386,582 A * | 1/1995 | Ebert | 377/44 |
| 6,396,805 B2 * | 5/2002 | Romrell | 370/216 |
| 6,473,819 B1 * | 10/2002 | Jackson et al. | 710/200 |
| 6,526,544 B1 * | 2/2003 | Peled et al. | 716/4 |
| 6,529,983 B1 | 3/2003 | Marshall et al. | 710/200 |
| 6,691,194 B1 * | 2/2004 | Ofer | 710/200 |
| 6,757,769 B1 * | 6/2004 | Ofer | 710/200 |
| 6,898,687 B2 | 5/2005 | Wu et al. | 711/173 |
| 6,971,049 B2 * | 11/2005 | Bakke et al. | 714/44 |
| 7,039,734 B2 * | 5/2006 | Sun et al. | 710/110 |
| 7,076,613 B2 * | 7/2006 | Peir et al. | 711/141 |
| 7,191,356 B2 * | 3/2007 | Barr et al. | 714/4 |
| 7,281,169 B2 * | 10/2007 | Golasky et al. | 714/43 |
| 2007/0061810 A1 * | 3/2007 | Mehaffy et al. | 718/104 |

* cited by examiner

*Primary Examiner*—Khanh Dang
*Assistant Examiner*—Christopher A Daley
(74) *Attorney, Agent, or Firm*—Kunzler & McKenzie

(57) ABSTRACT

An apparatus, system, and method are disclosed for autonomously overriding a global resource lock. The apparatus includes a determination module, an override module, and an assertion module. The determination module determines whether a global resource lock is owned by a peer resource controller and that the peer resource controller is offline in response to the peer resource controller owning the global resource lock. The atomic module atomically overrides ownership of the global resource lock from the peer resource controller. The assertion module asserts active ownership of the global resource lock. The apparatus, system, and method provide an autonomous override of the global resource lock, minimizing system downtime and user intervention.

18 Claims, 5 Drawing Sheets

APPARATUS, SYSTEM, AND METHOD FOR OVERRIDING RESOURCE CONTROLLER LOCK OWNERSHIP

BACKGROUND

1. Field of Art

This invention relates to shared controllable resources and more particularly relates to autonomously overriding a global resource lock of the shared controllable resources.

2. Background Technology

In a server environment where a plurality of controllable resources (e.g. storage resources such as hard drives, tape drives and optical storage drives) are shared in a joint or alternating fashion, access to a portion of the controllable resources may be made exclusive to a single resource controller (e.g. server) in order to execute a process while insuring that the coinciding data remains consistent and accurate. Typically the server environment consists of two or more resource controllers which mutually share requests from a plurality of connected host adapters, and execute those requests upon the plurality of connected storage adapters (e.g. controllable resources). One requirement of a resource controller is to be able to coordinate concurrent processes that share a plurality of controllable resources.

Typically, when a resource controller receives a request to execute a process, the resource controller will obtain a resource lock. The resource lock gives temporary exclusive control of the controllable resources required for a resource controller to execute a certain process. The resource lock may give exclusive access to a portion of a single controllable resource, an entire controllable resource, or a portion of all the controllable resources attached to the system. If a portion of the controllable resources requested is currently in use, the resource lock request is queued until the full portion of controllable resources requested is available. Having secured the resource lock, the process is executed, followed by the release of the resource lock.

In the continually evolving information age, one thing remains a constant: the need for 100% availability of mission-critical data and applications. Whether it is for stock markets, corporate payroll, e-commerce, enterprise databases, medical records, internet banking, or reasons of national security, the availability of these mission-critical resources grows inline with the demand for increased storage capacity.

One of the biggest hindrances to low total cost of ownership in the server environment is the labor associated with managing storage-related issues. Managing storage resources and data automatically by system resources, rather than manually, helps minimize this cost. However, ensuring system-wide availability of the mission-critical data and applications continues to present a unique management challenge. Mission-critical business systems typically span host and distributed computing environments, managing many of the business processes for the success of an organization. Sharing data from business processes with the other strategic systems and applications in the environment requires a comprehensive solution. Yet, the solution should be simple enough to be incorporated autonomously with minimal administrator oversight and without unduly burdening system performance.

The dominant server for such mission critical applications requiring management of large-scale databases continues to be mainframes. Mainframes, such as the IBM z9-109 class of enterprise servers, are designed for high reliability, performance, broad-based connectivity options, and comprehensive enterprise storage solutions. However, despite numerous advancements in storage management, there is still room for improvement in the area of high availability of mission-critical resources. A problem exists when a resource lock for exclusive access to all the controllable resources combined is given to a single resource controller and the controller fails while holding ownership of the lock.

For example, when communications between a dual cluster of resource controllers is severed, or when one of the resource controllers crashes, a protocol exists for a resource controller to race for global ownership of all controllable resources, a global exclusion that supersedes all existing resource locks. The first resource controller that wins the race takes ownership of all the controllable resources, whereas the resource controller that loses the race essentially becomes inactive, locked out from further accessing any of the controllable resources. This global exclusion can not be cleared until either both resource controllers are rebooted and come up with full functionality or the resource controller that loses the lock race comes back online with complete functionality and communications are restored.

Aside from the common side effects of mutual exclusion algorithms including deadlocks, starvation, and priority inversion, a problem exists in the case of the global exclusion algorithm. For example, when the resource controller goes down unexpectedly (e.g. crashes) holding the global resource lock, the other resource controller can not come up autonomously to take over the total ownership of the controllable resources. Access to all controllable resources is lost, causing complete loss in availability of mission-critical data and applications, further resulting in increased administrative workloads and storage administration costs in order to restore system resources. For example, suppose server-A and server-B race for ownership and server-A wins the race for global exclusion of all controllable resources. Server-A then crashes and is unable to come back online due to a hardware problem. Under these circumstances, server-B is isolated, and prevented from taking over the ownership of the global resource lock since the ability to release the ownership lock is lost within the offline server-A.

Conventional procedures are in place to resolve the lost lock scenario. One method involves bringing both resource controllers up together in order to clear the global resource lock, restore mutual access to system resources, and make the global resource lock available for a race in the future. However, besides requiring both resource controllers to be available for a system administrator to manually bring back up in a fully functional condition, high availability to the mission-critical data and applications is not maintained. Other conventional recoveries necessitate bringing the resource controller that is the current owner of the global resource lock back online by itself. However, this requires the resource controller with global exclusion of resources to be in a fully functional condition directly following a failure that caused it to crash. The recovery merely sets up the same scenario, except now the resource controller that holds the global resource lock has recently crashed, thereby making a repetition of the lost lock scenario more likely to happen again.

From the foregoing discussion, it should be apparent that a need exists for an apparatus, system, and method that overcome the limitations of conventional manual intervention lock override methods. In particular, such an apparatus, system, and method would beneficially be independent of administrative supervision, thereby offering autonomic device-level recovery. The apparatus, system, and method would also beneficially reduce administrative workloads and maintain high availability to mission-critical data and applications.

SUMMARY

The several embodiments of the present invention have been developed in response to the present state of the art, and in particular, in response to the problems and needs in the art that have not yet been fully solved by currently available lock recovery methods. Accordingly, the present invention has been developed to provide an apparatus, system, and method for autonomously overriding a global resource lock that overcome many or all of the above-discussed shortcomings in the art.

The apparatus to recover a global resource lock is provided with a logic unit containing a plurality of modules configured to functionally execute the necessary operations for an autonomic recovery of a global resource lock. These modules in the described embodiments include a determination module, an override module, and an assertion module. Further embodiments include a global resource lock, a verification module, a detection module, and an implementation module.

The global resource lock includes a lock indicator, and an activity indicator. The global resource lock grants globally exclusive access to all connected controllable resources that are part of the storage system. The lock indicator may include a field configured to hold a unique ID of a resource controller that holds the global resource lock. When a resource controller acquires the global resource lock, a number that uniquely identifies that resource controller is stored in the lock indicator. In one embodiment, the unique identification number of a resource controller is a hardware serial number, or a similarly unique identifying number.

The activity indicator indicates that the resource controller holding the global resource lock has active ownership of the global resource lock once ownership of the global resource lock is taken. Active ownership comprises periodically updating the activity indicator within a predefined interval.

The determination module may include a verification module and a detection module. The determination module determines whether the global resource lock is owned by a resource controller. The determination module also determines that a resource controller is offline if the resource controller also owns the global resource lock. A resource controller is considered offline when the activity indicator fails to change within a predefined interval. In response to the determination that the global resource lock is held by an offline resource controller, the determination module may send a recovery command to the override module. In one embodiment, a system administrator may attempt to restart the secondary resource controller by issuing a recovery command.

The verification module includes a check interval. The verification module is configured as part of a two-part verification process defined by a lock recovery protocol of the recovery apparatus also referred to herein as a recovery utility. In one embodiment, the verification module verifies that the unique ID stored in the lock indicator contains the unique identifying number of a resource controller that currently owns the global resource lock.

In one embodiment, the verification module verifies that the activity indicator fails to change within a predefined check interval. The check interval may be configured to be twice the period of the expected rate of change of the activity indicator. In response to the determination that the global resource lock is taken, the verification module examines the current value of the activity indicator and verifies that over the span of the predefined check interval, the activity indicator remains unchanged. If the activity indicator remains unchanged, the verification module verifies that the resource controller with ownership of the global resource lock is offline.

The detection module may detect a disruption in message traffic between resource controllers. In response to a disruption in message traffic detected, the detection module may signal each resource controller to race for ownership of the global resource lock.

The override module includes a clear module and a write module. The override module atomically overrides ownership of the global resource lock in response to receiving a recovery command from the determination module. The clear module clears the unique ID stored in the lock indicator, and the write module writes the unique ID of the resource controller currently taking the global resource lock.

In one embodiment, the clear module and the write module execute as part of an atomic operation, thus preventing any other operation from clearing or writing the lock indicator until the atomic operation is complete.

The assertion module may include an implementation module. The assertion module asserts active ownership of the global resource lock for the resource controller taking ownership of the global resource lock. As stated above, active ownership comprises periodically updating the activity indicator within a predefined heartbeat interval. The implementation module includes a heartbeat interval. The implementation module increments the activity indicator within the predefined heartbeat interval.

The heartbeat interval is a period within which the activity indicator is expected to change. The check interval is based upon the period of the heartbeat interval. In one embodiment, the check interval is configured to be twice the period of the heartbeat interval. Thus, in the case that the verification module checks the activity indicator immediately following an update of the activity indicator, the verification module will still detect at least one change in the activity indicator within the period of the check interval, indicating active ownership of the global resource lock.

A system of the present invention is also presented to autonomously override a global resource lock. The system may be embodied as a resource controller, the resource controller configured to allocate portions of a plurality of controllable resources.

In particular, the system, in one embodiment, includes a primary resource controller coupled to a plurality of controllable resources, the primary resource controller configured to allocate the plurality controllable resources. The system also includes a secondary resource controller coupled to the plurality of controllable resources, the secondary resource controller configured to allocate the plurality of controllable resources, and a global resource lock coupled to the primary resource controller and the secondary resource controller, the global resource lock having a plurality of registers. The system also includes a recovery apparatus in communication with the primary resource controller and the secondary resource controller, the recovery apparatus is configured to autonomously transfer ownership of the global resource lock from the primary resource controller to the secondary resource controller in response to a determination that the primary resource controller fails to update an activity indicator.

In a further embodiment, the system may include an ID holder, coupled to the global resource lock, the ID holder may be configured to store a string of unique identifying information, and a counter, coupled to the global resource lock, the counter configured to change at a predefined heartbeat interval.

A signal bearing medium is also presented to store a program that, when executed, performs operations to autonomously override a global resource lock. In one embodiment, the operations include determining whether a global resource lock is owned by a primary resource controller and determining that the primary resource controller is offline in response to the primary resource controller owning the global resource lock. In further embodiments, the operations include atomically overriding ownership of the global resource lock from the primary resource controller and asserting active ownership of the global resource lock by a secondary resource controller.

In another embodiment, the operations may include verifying that a lock indicator contains a unique ID of the primary resource controller, detecting a disruption in message traffic between the primary resource controller and the secondary resource controller, indicating the unique ID of the resource controller which currently owns the global resource lock, and indicating that the primary resource controller has active ownership of the global resource lock.

In a further embodiment, the operations may include periodically updating the activity indicator within a predefined heartbeat interval, verifying that the activity indicator fails to change within a check interval, clearing the lock indicator and writing the unique ID of a resource controller into the lock indicator as part of an atomic operation, and incrementing an activity indicator within a predefined heartbeat interval in response to the secondary resource controller taking ownership of the global resource lock.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Figure 1:
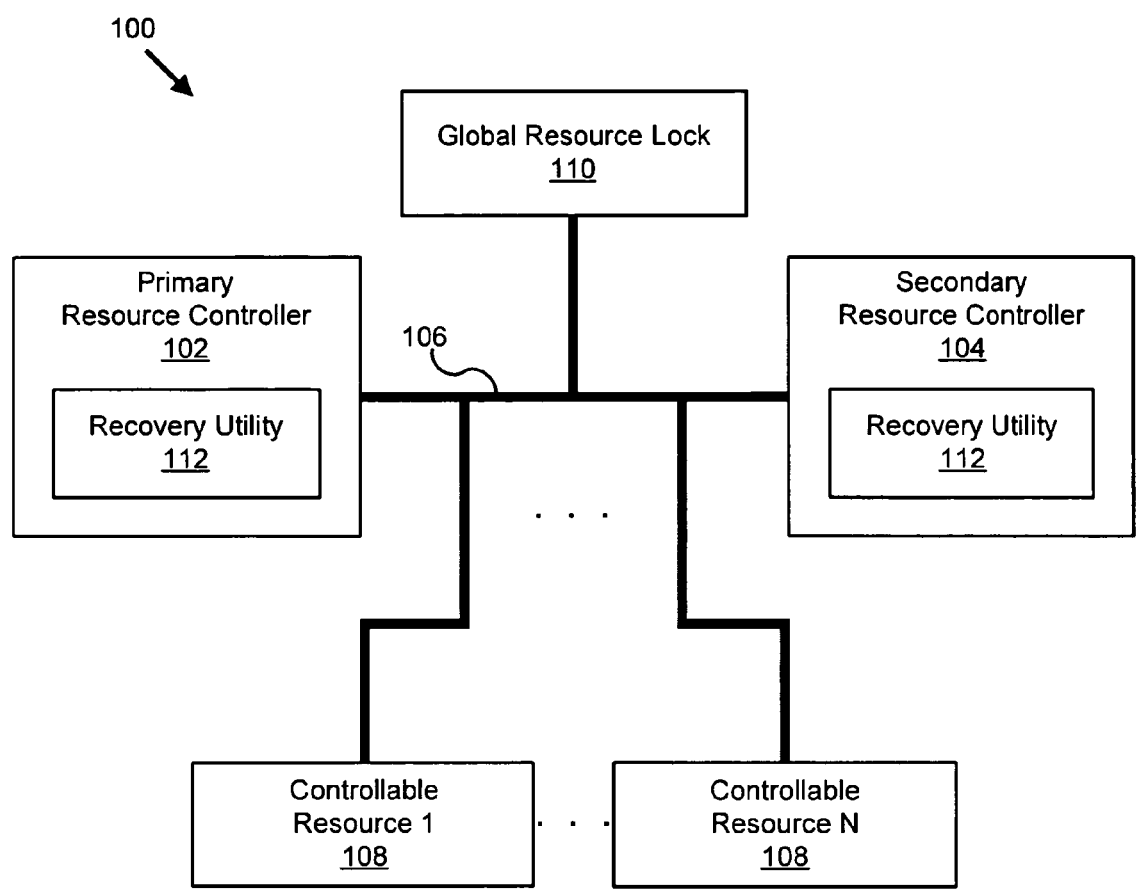
FIG. 1 is a schematic block diagram illustrating one embodiment of a storage system.

FIG. 1 depicts a schematic block diagram of one embodiment of a storage system 100. The illustrated storage system 100 includes a primary resource controller 102, a secondary resource controller 104, a communication channel 106, a plurality of controllable resources 108, and a global resource lock 110. The storage system 100 may store and access data on a plurality of controllable resources 108 according to the I/O operations of the primary resource controller 102 or the secondary resource controller 104 or both. In one embodiment, the storage system 100 may include two or more resource controllers. In further embodiments, the storage system 100 may include a single controllable resource 108 or a plurality of controllable resources 108.

The illustrated primary resource controller 102 and the secondary resource controller 104 may include a recovery utility 112. The primary resource controller 102 and the secondary resource controller 104 may be configured with a communication interface to communicate with the plurality of controllable resources 108 via a storage area network (SAN) or similar communication channel 106, such as a network, a backplane, or a bus. The communication channel 106 may send message traffic over a communication network.

Alternatively, the primary resource controller 102 and the secondary resource controller 104 may each be connected directly to a plurality of controllable resources 108.

The communication channel 106, in one embodiment, may be implemented using small computer system interface (SCSI), internet small computer system interface (iSCSI), serial advanced technology attachment (SATA), integrated drive electronics/advanced technology attachment (IDE/ATA), institute of electrical and electronic engineers standard 1394 (IEEE 1394), universal serial bus (USB), common internet file system (CIFS), network file system (NFS/NetWFS), hypertext transport protocol (HTTP), file transfer protocol (FTP), transmission control protocol/internet protocol (TCP/IP), fiber connection (FICON), enterprise systems connection (ESCON), a solid-state memory bus, or any other similar interface.

The primary resource controller 102 and the secondary resource controller 104 may be configured to act as a communication interface between a host computer (not shown) and the plurality of controllable resources 108. The primary resource controller 102 and the secondary resource controller 104 may use the communication channel 106 to access a portion of a controllable resource 108 according to a request by the host computer. The primary resource controller 102 and the secondary resource controller 104 access the plurality of controllable resources 108 in a joint or alternating fashion. The primary resource controller 102 and the secondary resource controller 104 may exclusively hold the portion of the controllable resource 108 accessed as long as required to execute a process so that the coinciding data remains consistent and accurate. The plurality of controllable resources 108 may consist of storage resources such as hard drives, tape drives, optical storage drives and/or any other similar storage devices.

In one embodiment, the primary resource controller 102 and the secondary resource controller 104 are continually messaging back and forth, much like a communication heartbeat, in order to acknowledge that an active communication link exists between the primary resource controller 102 and the secondary resource controller 104. The communication link times out between the primary resource controller 102 and the secondary resource controller 104 when one of the resource controllers fails to detect an active communication heartbeat from the other resource controller within a predefined communication timeout interval.

A communication failure may occur when the primary resource controller 102 or the secondary resource controller 104 crashes, or when a communication link fails. In response to the communication link timing out between the primary resource controller 102 and the secondary resource controller 104, each resource controller races to own a global resource lock 110 for exclusive control of the plurality of controllable resources 108 by the secondary resource controller 104.

For ease of clarification, the primary resource controller 102 is considered the resource controller that wins the race for ownership of the global resource lock 110. A primary resource controller 102 is further considered the resource controller that may crash, or go offline, while holding ownership of the global resource lock 110, thereby trapping the global resource lock 110 and blocking access to the plurality of all controllable resources 108 by the secondary resource controller 104.

For further ease of clarification, the secondary resource controller 104 is considered the resource controller that loses the race for ownership of the global resource lock 110. A secondary resource controller 104 is further considered to be the resource controller that recovers ownership of a trapped global resource lock 110 and thereby regains access to the plurality of controllable resources 108. Thus, in response to the secondary resource controller 104 taking ownership of the global resource lock 110, the secondary resource controller 104 is then considered the primary resource controller 102. And the primary resource controller 102, after crashing while holding the global resource lock 110, is then considered the secondary resource controller 104, since it no longer holds the global resource lock 110. In summary, the resource controller holding the global resource lock before or after recovery is the primary resource controller 102.

In one embodiment, the global resource lock 110 is independent of the primary resource controller 102 or the secondary resource controller 104, or both. In another embodiment, the global resource lock 110 is included in the recovery utility 112. One example of the global resource lock 110 is shown and described in more detail with reference to FIG. 2.

In one embodiment, in response to the secondary resource controller 104 losing the race for ownership of the global resource lock 110, the secondary resource controller 104 is manually rebooted and communications to the primary resource controller 102 are tested. In another embodiment, the secondary resource controller 104 reboots autonomically. If communications are reestablished between the primary resource controller 102 and the secondary resource controller 104, the primary resource controller 102 releases ownership of the global resource lock 110. The primary resource control 102 and the secondary resource controller 104 then return to a normal operating environment sharing access to the plurality of controllable resources 108.

However, if communications are not reestablished, and the primary resource controller 102 crashes while holding the global resource lock 110, the secondary resource controller 104 may be configured to utilize the recovery utility 112 in order to take control of the trapped global resource lock 110 according to a lock recovery protocol established by the recovery utility 112. In one embodiment, the recovery utility 112 is executed as part of firmware stored on and executed from the secondary resource controller 104. In a further embodiment, the recovery utility 112 is an integral and autonomic operation within the secondary resource controller 104. In another embodiment, the recovery utility 112 is operated independent of the secondary resource controller 104, such as by a system-user or administrator.

Figure 2:
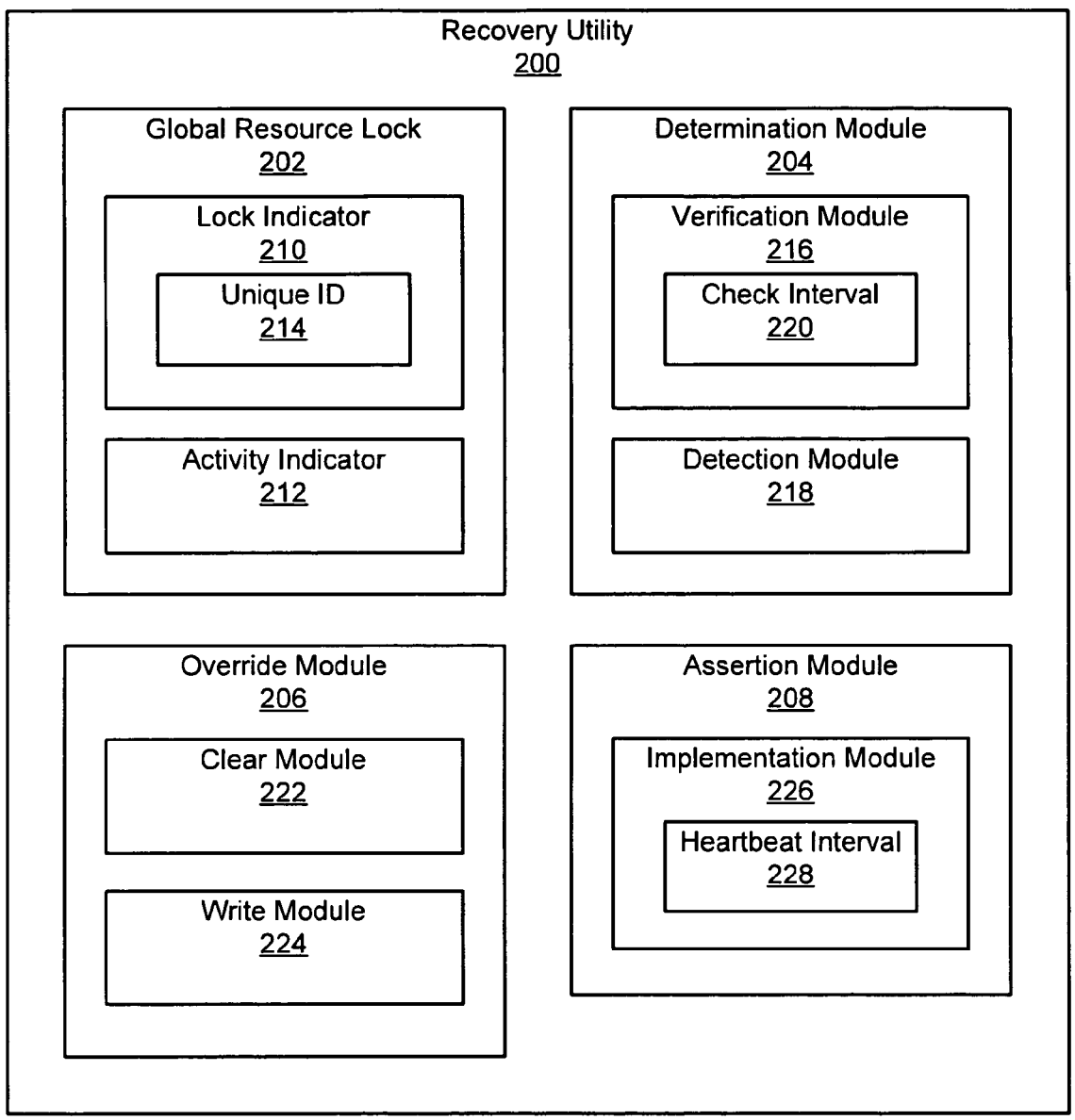
FIG. 2 is a schematic block diagram illustrating one embodiment of a recovery utility.

FIG. 2 depicts one embodiment of a recovery utility 200 that may be substantially similar to the recovery utility 112 of FIG. 1. The illustrated recovery utility 200 includes a global resource lock 202, a determination module 204, an override module 206, and an assertion module 208. The recovery utility 200 may be activated once the secondary resource controller 104 determines a global resource lock 202 has been trapped by the primary resource controller 102. As described in FIG. 1, the recovery utility 200 recovers a trapped global resource lock 202 according to the lock recovery protocol. The lock recovery protocol establishes the manner in which the secondary resource controller 104 may recover a trapped global resource lock 202.

The illustrated global resource lock 202 includes a lock indicator 210, and an activity indicator 212. The global resource lock 202 is an exclusive lock held by the primary resource controller 102 or taken by the secondary resource controller 104. The global resource lock 202 grants globally exclusive access to all connected controllable resources 108 that are part of the storage system 100. The lock indicator 210 includes a field configured to hold the unique ID 214 of the primary resource controller 102 that currently holds the global resource lock 202, thus indicating to a user or system administrator which resource controller currently holds the global resource lock 202.

The lock indicator 210 may also contain other fields besides the unique ID 214. When the primary resource controller 102 acquires the global resource lock 202, a number that uniquely identifies the primary resource controller 102 is stored in the lock indicator 210. When the secondary resource controller 104 takes the global resource lock 202, a number that uniquely identifies the secondary resource controller 104 is stored in the lock indicator 210. In one embodiment, the unique identification number of a resource controller is a hardware serial number, or a similar unique identifying number.

The activity indicator 212 indicates that the primary resource controller 102 has active ownership of the global resource lock 202. Active ownership means periodically updating the activity indicator 212 within a predefined interval. In other words, in order to demonstrate active ownership, the primary resource controller 102 periodically updates the activity indicator 212 within the predefined interval.

The illustrated determination module 204 includes a verification module 216, and a detection module 218. The determination module 204 determines whether the global resource lock 202 is owned by the primary resource controller 102. The determination module 204 also determines that the primary resource controller 102 is offline while holding the global resource lock 202. The primary resource controller 102 is considered offline when the secondary resource controller 104 fails to detect a change in the activity indicator 212 within a predefined check interval 220. In other words, the determination module 204 determines that the global resource lock 202 is trapped by the primary resource controller 102. In response to the determination that the global resource lock 202 is trapped, the determination module 204 may signal the override module 206.

The verification module 216 includes the check interval 220. The verification module 216 is configured as part of a two-part verification process as defined by the lock recovery protocol of the recovery utility 200. In one embodiment, the verification module 216 verifies that the unique ID 214 stored in the lock indicator 210 contains the unique identifying number of the primary resource controller 102 if the primary resource controller 102 owns the global resource lock 202.

In one embodiment, the verification module 216 verifies that the activity indicator 212 fails to change within the predefined check interval 220. The check interval 220 may be configured to be twice the period of the expected rate of change of the activity indicator 212. In response to the determination that the global resource lock 202 is taken, the verification module 216 examines the current value of the activity indicator 212 and verifies that over the span of the predefined check interval 220, the activity indicator 212 remains unchanged. Conversely, when the verification module 216 fails to verify that the activity indicator 212 remains unchanged, but that the activity indicator 212 is changing, the verification module 216 verifies that the race for ownership of the global resource lock 202 has indeed been lost.

The detection module 218 detects a disruption in message traffic between the primary resource controller 102 and the secondary resource controller 104. In response to a disruption in message traffic detected, the detection module 218 signals the primary resource controller 102 and/or the secondary resource controller 104 to race for ownership of the global resource lock 202.

The illustrated override module 206 includes a clear module 222 and a write module 224. The override module 206 atomically overrides ownership of the global resource lock 202 from the primary resource controller 102 in response to a signal from the determination module 204. In one embodiment, the determination module 204 may send a recovery command to the override module 206. The clear module 222 clears the unique ID 214 stored in the lock indicator 210, and the write module 224 writes the unique ID 214 of the secondary resource controller 104 into the lock indicator 210 in response to the primary resource controller 102 going offline while holding the global resource lock 202, thereby trapping the global resource lock 202.

As described above, in response to the primary resource controller 102 owning the global resource lock 202, the primary resource controller 102 is considered offline when the activity indicator 212 is verified to be static, that is to say, that the primary resource controller 102 is not incrementing the activity indicator 212 while holding ownership of the global resource lock 202.

In one embodiment, the clear module 222 and the write module 224 execute as part of an atomic operation, an operation in which the override module 206 can simultaneously clear and write the unique ID 214 into the lock indicator 210, thus preventing any other operation from clearing or writing the lock indicator 210 until the atomic operation is complete.

The illustrated assertion module 208 includes an implementation module 226. The assertion module 208 asserts active ownership of the global resource lock 202 by the secondary resource controller 104 in response to the secondary resource controller 104 taking ownership of the global resource lock 202 from the primary resource controller 102. As stated above, active ownership comprises periodically updating the activity indicator 212 within a predefined heartbeat interval 228. The implementation module 226 increments the activity indicator 212 within the predefined heartbeat interval 228 in response to the primary resource controller 102 or the secondary resource controller 104 taking ownership of the global resource lock 202.

The heartbeat interval 228 is a period of time in which the activity indicator 212 is expected to change. The check interval 220 is based upon the period of the heartbeat interval 228. In one embodiment, the check interval 220 is configured to be twice the period of the heartbeat interval 228. For example, if the heartbeat interval 228 is determined to be a thirty-second interval, as a result the check interval 220 is a one-minute interval. Therefore, in the case that the verification module 216 checks the activity indicator 212 immediately following an update of the activity indicator 212, the verification module 216 will still detect at least one change in the activity indicator 212 within the period of the check interval 220, implying active ownership of the global resource lock 202. In certain embodiments, the check interval 220 and the heartbeat interval 228 may be configured by a host computer, an administrator, determined by a programmed software variable, or any other similar configuration scheme.

Figure 3:
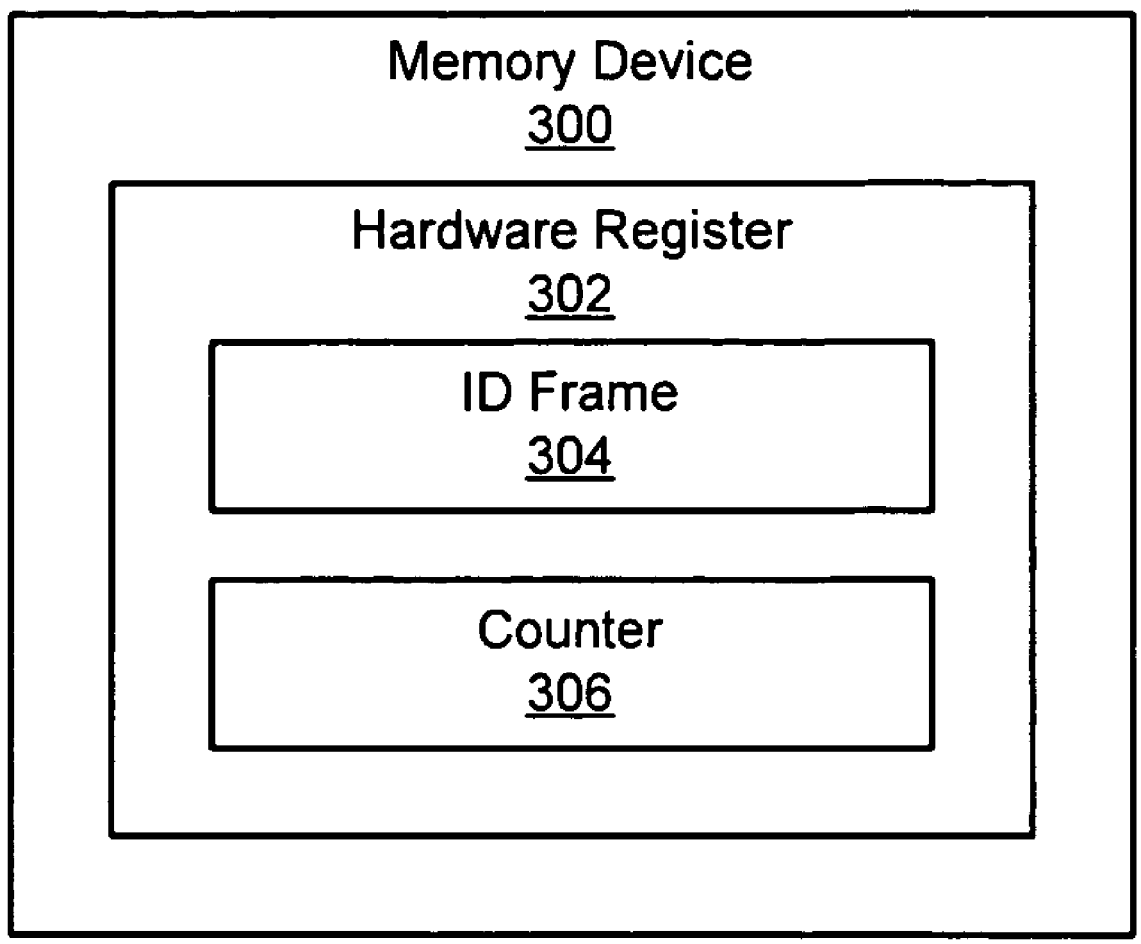
FIG. 3 is a schematic block diagram illustrating one embodiment of a memory device.

FIG. 3 depicts one embodiment of a memory device 300 that may be implemented in conjunction with the recovery utility 200 of FIG. 2. In one embodiment, the memory device 300 may be substantially similar to the global resource lock 202 of FIG. 2. The illustrated memory device 300 includes a hardware register 302. The memory device 300 may comprise one or more non-volatile semiconductor devices, such as a flash memory, static random access memory (SRAM), non-volatile random access memory (NVRAM), electrically erasable programmable read-only memory (EEPROM), erasable programmable read only memory (EPROM), NAND/AND, NOR, divided bit-line NOR (DINOR), or any other similar memory device.

In one embodiment, the memory device 300 is an integral part of the primary resource controller 102 and the secondary resource controller 104. In another embodiment, the memory device 300 is a separate part of the storage system 100, independent of the primary resource controller 102 and/or the secondary resource controller 104. The hardware register 302 may include an ID frame 304 and a counter 306. In one embodiment, the hardware register 302 is accessed by the recovery utility 200 of FIG. 2 according to the lock recovery protocol. In certain embodiments, the ID frame 304 and the counter 306 may be included in the same hardware register 302, or may be part of individual hardware registers 302.

The ID frame 304 may be substantially similar to the lock indicator 210 of FIG. 2 that contains the unique ID 214 of the primary resource controller 102 in response to the primary resource controller 102 owning the global resource lock 202. The counter 306 may be substantially similar to the activity indicator 212 of FIG. 2. In one embodiment, the counter 306 may be an up counter (increment), a down counter (decrement), an asynchronous (ripple) or synchronous counter which may be implemented in a d-type or j-k flip flop, a Johnson or walking ring counter, or a finite state machine (FSM). In a further embodiment, the counter 306 is updated within a predefined heartbeat interval 228 wherein active ownership of the global resource lock 202 is asserted.

In another embodiment, the activity indicator 212 may be implemented in a sequence. The sequence may be a finite sequence, an infinite sequence, a monotonically increasing or monotonically decreasing sequence, an integer sequence, a polynomial sequence, a linear sequence or arithmetic progression. In certain embodiments, the activity indicator 212 may be implemented in hexadecimal, binary or binary coded decimal.

Figure 4:
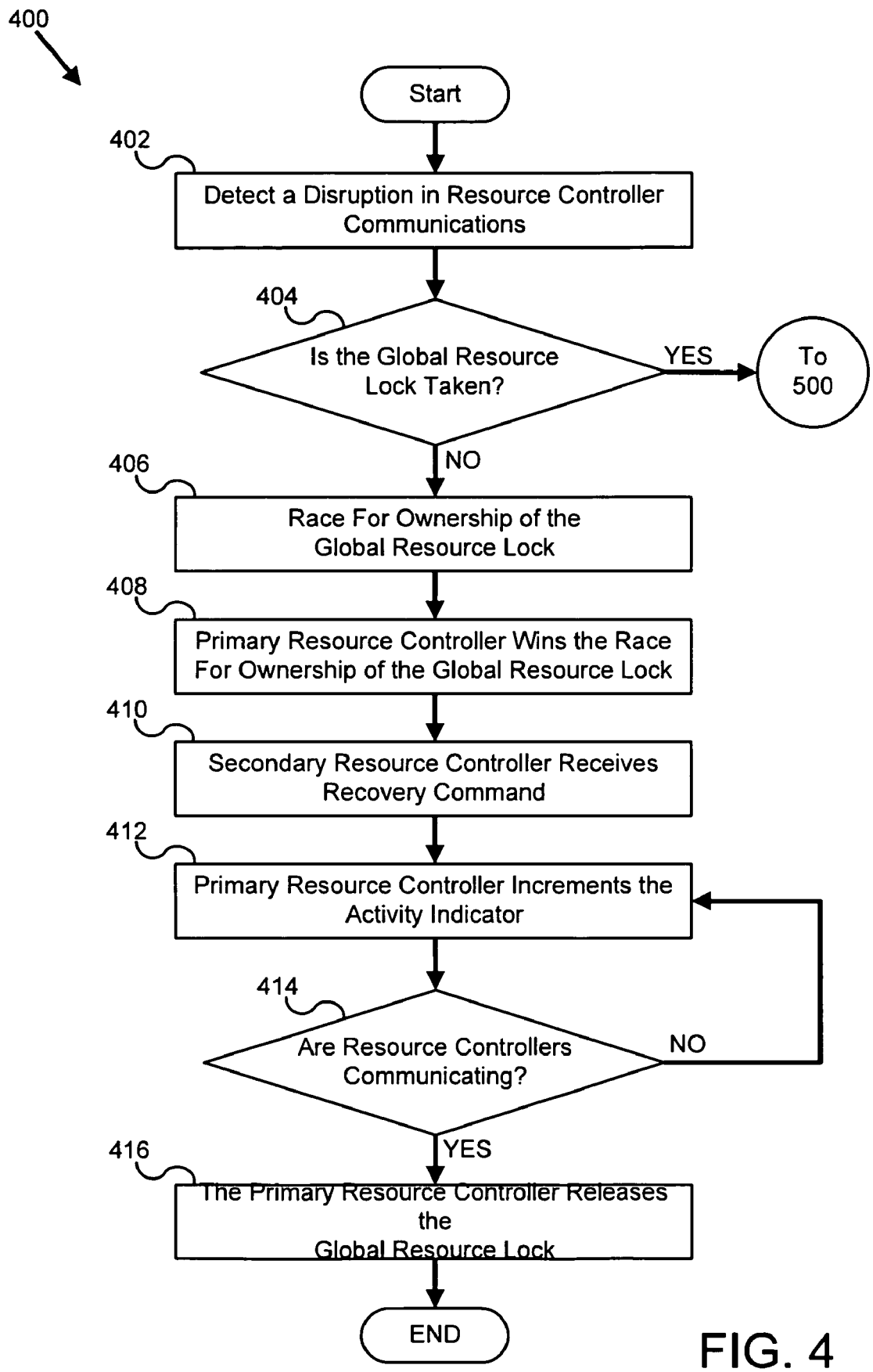
FIG. 4 is a schematic flow chart diagram illustrating one embodiment of a dual resource controller initialization method.

FIG. 4 depicts one embodiment of a dual resource controller initialization method 400 that may be implemented by the recovery utility 200 of FIG. 2. The dual resource controller initialization method 400 is described herein with reference to the storage system 100 of FIG. 1. Although the dual resource controller initialization method 400 is depicted in a certain sequential order, for purposes of clarity, the storage system 100 may perform the operations in parallel and/or not necessarily in the depicted order.

The dual resource controller initialization method 400 starts and the detection module 218, in one embodiment, detects 402 a disruption in message traffic between the primary resource controller 102 and the secondary resource controller 104. Next, the determination module 204 determines 404 whether ownership of the global resource lock 202 is taken. In one embodiment, the verification module 216 verifies whether the global resource lock 202 is taken. If the determination module 204 determines 404 that ownership of the global resource lock 202 is taken, the dual resource controller initialization method 400 proceeds to the recovery method 500.

In one embodiment, suppose that after rebooting from going offline while holding the global resource lock 202, the primary resource controller 102 detects 402 the continued disruption in communication to the secondary resource controller 104. The primary resource controller 102 may then determine 404 that the global resource lock 202 is taken. Thus, while the secondary resource controller 104 takes on the role of the primary resource controller 102 by recovering ownership of the global resource lock 202, the rebooted primary resource controller 102 may take on the role of the secondary resource controller 104 and proceed to the recovery method 500.

If the determination module 204 determines 404 that the global resource lock 202 is not taken, the determination module 204 may signal the primary resource controller 102 and the secondary resource controller 104 to race 406 for ownership of the global resource lock 202. Next, the winner of the race becomes the primary resource controller 102 and takes 408 the global resource lock 202.

Next, a system administrator may attempt to restart the secondary resource controller 104 by issuing a recovery command. In one embodiment, the secondary resource controller 104 receives 410 the recovery command from the determination module 204, which may instruct the secondary resource controller 104 to initiate the dual resource controller initialization method 400.

The primary resource controller 102 then proceeds to increment 412 the activity indicator 212 within a predefined heartbeat interval 228. Next, the determination module 218 determines 414 whether the disruption in communication between the primary resource controller 102 and the secondary resource controller 104 persists. If the disruption in communication continues between primary resource controller 102 and the secondary resource controller 104, then the primary resource controller 102 continues to demonstrate active ownership of the global resource lock 202 by incrementing 412 the activity indicator 212 within the predefined heartbeat interval 228.

Conversely, if the determination module 218 determines 414 that the disruption in communication between the primary resource controller 102 and the secondary resource controller 104 no longer exists, and that communications are linked, then the primary resource controller 102 proceeds to release 416 the global resource lock 202. In one embodiment, the clear module 222 releases 416 the global resource lock 202 by clearing the unique ID 214. The primary resource control 102 and the secondary resource controller 104 return to a normal operating environment sharing access to the plurality of controllable resources 108.

Figure 5:
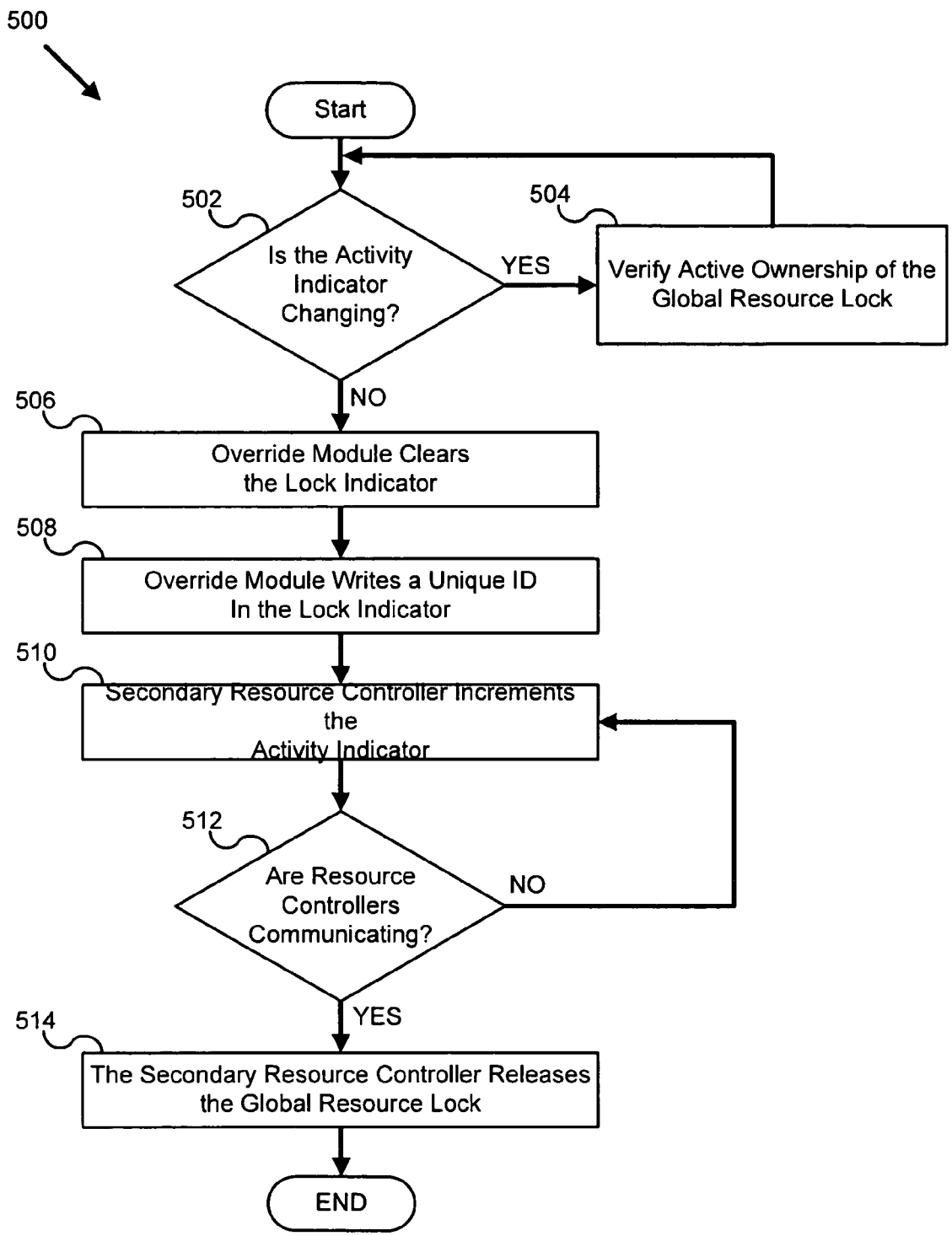
FIG. 5 is a schematic flow chart diagram illustrating one embodiment of a lock override method.

FIG. 5 depicts one embodiment of a recovery method 500 that may be implemented by the recovery utility 200 of FIG. 2. The recovery method 500 is described herein with reference to the storage system 100 of FIG. 1.

The recovery method 500 includes operations to determine 502 whether an activity indicator 212 is changing, clear 504 the lock indicator 210, write 506 a unique ID 214 to the lock indicator 210, increment 508 the activity indicator 212, determine 510 whether the primary resource controller 102 and the secondary resource controller 104 reestablish communications, and release 512 the global resource lock 202.

The recovery method 500 initiates the recovery abilities of the recovery utility 200 associated with the secondary resource controller 104. Although the recovery method 500 is depicted in a certain sequential order, for purposes of clarity, the storage system 100 may perform the operations in parallel and/or not necessarily in the depicted order.

Initially, the determination module 204 determines 502 whether the activity indicator 212 is changing. If the determination module 204 determines 502 that the activity indicator 212 is changing, then the secondary resource controller 104 verifies 504 that the primary resource controller 102 has active ownership of the global resource lock 202. In one embodiment, the verification module 216 verifies 504 that the activity indicator 212 changes within a check interval 220. Next, the recovery method 500 may terminate.

Conversely, if the determination module 204 determines 502 that the activity indicator 212 is not changing within a check interval 220, then the override module 206 proceeds to clear 506 the lock indicator 210 and writes 508 the unique ID 214 of the secondary resource controller 104 in the lock indicator 210. In one embodiment, the lock indicator 210 is cleared 506 by the clear module 222, and written 508 by the write module 224, in a simultaneous operation, wherein the clear module 222 and the write module 224 execute as part of an atomic operation.

Once the recovery method 500 atomically clears 506 and writes 508 the lock indicator 210, the implementation module 226 increments 510 the activity indicator 212, thereby asserting active ownership of the global resource lock 202. Having taken ownership of the global resource lock 202 from the primary resource controller 102, the secondary resource controller 104 assumes the role of the primary resource controller 102 with ownership of the global resource lock 202.

Next, the detection module 218 determines 512 whether the disruption in communication between the primary resource controller 102 and the secondary resource controller 104 persists. If the disruption in communication continues between primary resource controller 102 and the secondary resource controller 104, then the primary resource controller 102 (formerly secondary controller 104) continues to assert active ownership of the global resource lock 202 by incrementing 510 the activity indicator 212 within the predefined heartbeat interval 228.

Conversely, if the disruption in communication between the primary resource controller 102 and the secondary resource controller 104 no longer exists and communications are linked, the secondary resource controller 104 proceeds to release 514 the global resource lock 202. The primary resource control 102 and the secondary resource controller 104 return to a normal operating environment sharing access to the plurality of controllable resources 108.

The recovery of a trapped global resource lock 202 imparted by the present invention can have a positive impact on overall system performance. In certain embodiments, the present invention improves uptime, application availability, and real time business performance, all of which results in driving lower the total cost of ownership. In addition to recovering a trapped global resource lock 202 from a failed resource controller, embodiments of the present invention afford the system administrator the ability to replace the failed resource controller without affecting downtime. In one embodiment, the present inventions provides an autonomous override of the global resource lock, minimizing system administrator intervention The schematic flow chart diagrams included herein are generally set forth as logical flow chart diagrams. As such, the depicted order and labeled operations are indicative of one embodiment of the presented method. Other operations and methods may be conceived that are equivalent in function, logic, or effect to one or more operations, or portions thereof, of the illustrated method. Additionally, the format and symbols employed are provided to explain the logical operations of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated operations of the depicted method. Additionally, the order in which a particular method occurs may or may not strictly adhere to the order of the corresponding operations shown.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to autonomously override a global resource lock, the apparatus comprising:
   a detection module configured to detect a disruption severing communications in message traffic between a primary resource controller and a secondary resource controller, wherein the primary resource controller wins a race for ownership of a global resource lock over the secondary resource controller in response to the disruption and an activity indicator indicates that the primary resource controller has ownership of the global resource;
   a determination module configured to determine whether the global resource lock is owned by the primary resource controller and to determine that the primary resource controller is offline and communicate a signal in response to the primary resource controller owning the global resource lock and the primary resource controller not updating the activity indicator within a check interval, the global resource lock comprising a lock indicator configured to indicate a unique ID of the primary resource controller which currently owns the global resource lock and the activity indicator and wherein the primary resource controller updates the activity indicator within a heartbeat interval that is half the check interval when the primary resource controller is online; and
   the determination module further configured to detect an end of the disruption and direct a clear module to release the global resource lock.

2. The apparatus of claim 1, wherein the determination module comprises a verification module configured to verify that the lock indicator contains the unique ID of the primary resource controller.

3. The apparatus of claim 1, wherein the assertion module comprises an implementation module configured to increment the activity indicator within the heartbeat interval in response to the secondary resource controller taking ownership of the global resource lock.

4. The apparatus of claim 1, wherein the activity indicator is configured as a sequence selected from a polynomial sequence and an arithmetic progression.

5. The apparatus of claim 1, further comprising:
an override module configured to atomically override ownership of the global resource lock from the primary resource controller in response to receiving the signal from the determination module; and
an assertion module in communication with the override module, the assertion module configured to assert active ownership of the global resource lock by the secondary resource controller.

6. The apparatus of claim 5, wherein the override module comprises:
the clear module configured to clear the lock indicator;
a write module configured to write the unique ID of the secondary resource controller into the lock indicator; and
wherein the clear module and the write module execute as part of an atomic operation.

7. A system to autonomously override a global resource lock, the system comprising:
a primary resource controller coupled to a plurality of controllable resources, the primary resource controller configured to allocate the plurality of controllable resources;
a secondary resource controller coupled to the plurality of controllable resources, the secondary resource controller configured to allocate the plurality of controllable resources;
a global resource lock coupled to the primary resource controller and the secondary resource controller, the global resource lock having a plurality of registers; and
a recovery utility in communication with the primary resource controller and the secondary resource controller, the recovery utility configured to detect a disruption severing communications in message traffic between the primary resource controller and the secondary resource controller wherein the primary resource controller wins a race for ownership of a global resource lock over the secondary resource controller in response to the disruption and an activity indicator indicates that the primary resource controller has ownership of the global resource, detect an end of the disruption and release the global resource lock, and autonomously transfer ownership of the global resource lock from the primary resource controller to the secondary resource controller in response to a determination the primary resource controller fails to update the activity indicator within a check interval, the primary resource controller updating the activity indicator within a heartbeat interval that is half the check interval when the primary resource controller is online.

8. The system of claim 7, further comprising an ID holder, coupled to the global resource lock, the ID holder configured to store a string of unique identifying information.

9. The system of claim 7, wherein the activity indicator is configured as a counter coupled to the global resource lock, the counter configured to change at the heartbeat interval.

10. The system of claim 9, wherein the counter is selected from a down counter and an asynchronous ripple counter.

11. A program of executable code stored on a semiconductor device and executed by a processor to perform operations to autonomously override a global resource lock, the operations comprising:
detecting a disruption severing communications in message traffic between a primary resource controller and a secondary resource controller, wherein the primary resource controller wins a race for ownership of a global resource lock over the secondary resource controller in response to the disruption and an activity indicator indicates that the primary resource controller has ownership of the global resource;
releasing the global resource lock if an end of the disruption is detected, else;
determining whether the global resource lock is owned by the primary resource controller; and
determining that the primary resource controller is offline in response to the primary resource controller owning the global resource lock and the primary resource controller failing to update the activity indicator within a check interval, the primary resource controller updating the activity indicator within a heartbeat interval that is half the check interval when the primary resource controller is online.

12. The program of claim 11, wherein determining whether the global resource lock is owned by the primary resource controller comprises verifying that a lock indicator contains a unique ID of the primary resource controller.

13. The program of claim 12, wherein the global resource lock comprises:
the lock indicator indicating the unique ID of the primary resource controller which currently owns the global resource lock; and
the activity indicator indicating that the primary resource controller has active ownership of the global resource lock.

14. The program of claim 11, wherein determining that the primary resource controller is offline comprises the secondary resource controller verifying that the activity indicator fails to change within the check interval.

15. The program of claim 11, wherein asserting active ownership of the global resource lock comprises incrementing the activity indicator within the heartbeat interval in response to the secondary resource controller taking ownership of the global resource lock.

16. The program of claim 11, the operations further comprising:
atomically overriding ownership of the global resource lock from the primary resource controller; and
asserting active ownership of the global resource lock by the secondary resource controller.

17. The program of claim 16, wherein atomically overriding ownership of the global resource lock from the primary resource controller comprises:
clearing a lock indicator;
writing a unique ID of the secondary resource controller into the lock indicator; and
executing the clearing of the lock indicator and the writing of the unique ID of the secondary resource controller into the lock indicator as part of an atomic operation.

18. A method for deployment of software for autonomously overriding a global resource lock, the method comprising:
installing an ownership module configured to establish and maintain a global resource lock;

detecting a disruption severing communications in message traffic between a primary resource controller and a secondary resource controller, wherein the primary resource controller wins a race for ownership of the global resource lock over the secondary resource controller in response to the disruption and an activity indicator indicates that the primary resource controller has ownership of the global resource; and executing a recovery utility configured to:
  release the global resource lock if an end of the disruption is detected, else;
  determine whether the global resource lock is owned by the primary resource controller;
  determine that the primary resource controller is offline in response to the primary resource controller owning the global resource lock and the primary resource controller failing to update the activity indicator within a check interval, the primary resource controller updating the activity indicator within a heartbeat interval that is half the check interval when the primary resource controller is online;
  atomically override ownership of the global resource lock from the primary resource controller; and
  assert active ownership of the global resource lock by the secondary resource controller.

* * * * *